Feb. 26, 1963   J. C. PAWLAK   3,079,456
DEFERRED ACTION BATTERY
Filed Oct. 28, 1960
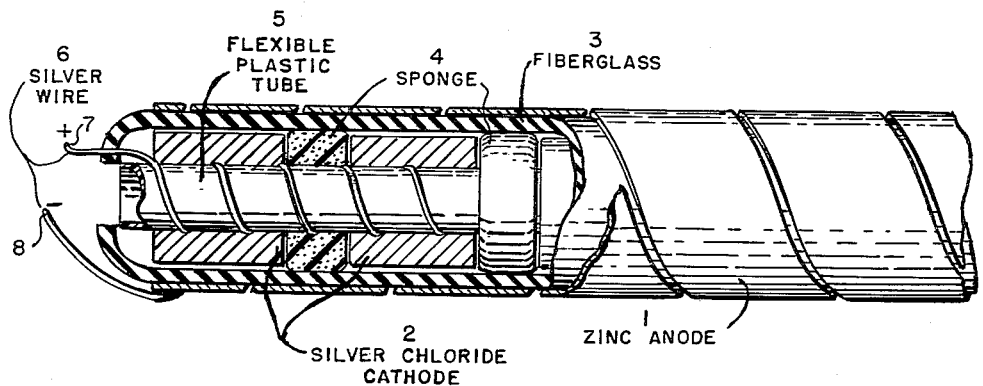
INVENTOR,
JOSEPH C. PAWLAK.
BY
Jack H. Linscott
ATTORNEY

United States Patent Office 3,079,456
Patented Feb. 26, 1963

3,079,456
DEFERRED ACTION BATTERY
Joseph C. Pawlak, Red Bank, N.J., assignor to the United States of America as represented by the Secretary of the Army
Filed Oct. 28, 1960, Ser. No. 65,871
6 Claims. (Cl. 136—90)
(Granted under Title 35, U.S. Code (1952), sec. 266)

The invention described herein may be manufactured and used by or for the Government for governmental purposes without the payment of any royalty thereon.

The invention relates to reserve type, sea water-activated, special purpose batteries used to power transistorized repeaters, spaced at definite intervals in under water communication cables. Such special purpose batteries are designed for drain rates of 0.06 ma. per square centimeter of electrode surface, a voltage of about 1 volt, and should operate at this voltage for one to two years at operating temperatures of about 10° F. to 120° F. Since these batteries are connected with the under water cable and since such cables have to be rolled up on large drums the battery must have sufficient flexibility to be bent together with the cable.

Heretofore such cable batteries or snake batteries were made by connecting in parallel a great number, about 40 to 50 cells, segmented for flexibility and stacked in cable or snake form one after the other.

The electrochemical system used in such snake type batteries is the system zinc-silver chloride which may be activated by sea water. Each cell consist of an outer zinc cylinder as the anode and an inner silver chloride cylinder as the cathode. All the silver chloride cylinders of the individual cells are placed on a flexible plastic tube and a porous separator is inserted between the outer zinc anode and the inner silver chloride cathode. The individual cells are flexibly separated by spongy washers. All cells are connected in parallel. The outer zinc cylinders are connected by wires soldered directly to neighboring zinc cylinders. A piece of silver wire is wound in a spiral fashion on the plastic tubing which carries the silver chloride cylinders thus making an electrical connection between all silver chloride cathodes. These known snake batteries show however great disadvantages in that the soldered wire connections between neighboring zinc cylinders are liable to deterioration and breakage due to the fact that creepage occurs on the outside of the zinc cylinder anodes. Since all the cells are connected in parallel the whole battery becomes useless as soon as one intercell connection is disrupted.

I now have found that all these disadvantages may be easily overcome by making the zinc anodes of the snake battery part of a spirally wound zinc band so that parts of the zinc band constitute the anodes of each cell while the remaining parts constitute the electrical connections between the cells.

A specific embodiment of the inventive idea is shown in the appended drawing in which 1 is the zinc anode consisting of a continuous strip of zinc wound in such a manner that it forms an anode for each individual silver chloride cathode 2. At the same time it also acts as a protective shield for the battery preventing damage by dragging the cable against rocks, etc. under water. The silver chloride cathodes 2 are pressed in cylinder form from powdered silver chloride. They are separated from the zinc anode 1 by a porous layer of fine mesh fiber glass 3 and from each other by a spongy separator 4. Both the silver chloride cathodes 2 and the spongy separators 4 are stacked on a flexible plastic tube 5. A silver wire 6 wound around the plastic tube 5 connects all the silver chloride cathodes 2 and its end constitutes the positive terminal 7. Another silver wire is soldered to the end of the zinc strip and constitutes the negative terminal 8.

To prevent unnecessary corrosion on the outside surface area a rubber base adhesive (not shown in the drawing) may be applied over the outside surface area of the zinc anode 1. This not only lengthens the useful life of the zinc but also acts as a cushion for the battery, increasing its ruggedness and reliability.

The fine mesh fiber glass layer 3 that separates the zinc anode 1 from the silver chloride cathode 2 must of course allow the necessary ionic conduction but the pores may be fine enough to serve as a filter thereby preventing a build-up of by-products resulting from the electrochemical reactions from shorting the battery.

The new snake battery has proved to remain operational for periods of one to two years without deterioration and without physical destruction to the extent that would interrupt the connections between the individual cells through the zinc strip.

It will be obvious to those skilled in the art that many changes and modifications as well as substitutions of materials may be carried out within the scope of the invention as exemplified in the above-described specific embodiments. It is, for instance, possible to solder one or two zinc wires lengthwise to the strip of zinc in order to lengthen the useful life of the snake batteries at a time where the zinc strip may be so corroded that it would interrupt the connection between the individual cells. Many other modifications are, of course, feasible within the broad idea defined in the appended claims.

What is claimed is:

1. A deferred action battery comprising a reserve type sea water-activated battery for powering transistorized repeaters spaced at definite intervals in under water communication cables comprising a spirally wound anode metal strip, parts of which constitute the anodes of a number of cells connected in parallel while the remaining parts of the anode metal strip constitute the electrical connections between neighboring cells, individual cylinders of cathodic material stacked on a flexible plastic tube, a silver wire wound around said plastic tube connecting all individual cathodes in parallel, a porous layer of fine mesh fiber glass separating the anodes from the cylindrical cathodes and spongy separators stacked on said flexible plastic tube flexibly separating said cylindrical cathodes.

2. A deferred action battery according to claim 1 in which said spirally wound anode metal strip consists of zinc and said cathodic material consists of silver chloride.

3. A deferred action battery according to claim 1 in which said anode metal strip is separated from said cathode cylinders by a layer of fine mesh fiber glass the pores of which are fine enough to serve as a filter while allowing ionic conduction.

4. A deferred action battery according to claim 1 in which the outside surface area of the spirally wound anode metal strip is covered with a rubber base adhesive.

5. A deferred action battery according to claim 1 in which at least one metal wire is soldered lengthwise to the spirally wound anode metal strip.

6. A deferred action battery according to claim 2 in which at least one zinc wire is soldered to the spirally wound zinc strip.

References Cited in the file of this patent
UNITED STATES PATENTS

| | | |
|---|---|---|
| 912,946 | Easlman | Feb. 16, 1909 |
| 1,786,945 | Hendry | Dec. 30, 1930 |
| 2,564,495 | Mullen | Aug. 14, 1951 |
| 2,715,652 | Chubb | Aug. 16, 1955 |
| 2,852,591 | Ruben | Sept. 16, 1958 |